United States Patent [19]
Harrison

[11] Patent Number: 5,365,493
[45] Date of Patent: Nov. 15, 1994

[54] AIR GUN

[76] Inventor: E. R. Harrison, P.O. Box 42800, Houston, Tex. 77242-8044

[21] Appl. No.: 961,380

[22] Filed: Oct. 15, 1992

[51] Int. Cl.5 .......................... H04R 23/00; G01V 1/04
[52] U.S. Cl. .................................... 367/144; 181/120; 251/63
[58] Field of Search ................. 367/144; 181/120; 251/63, 63.5

[56] References Cited

U.S. PATENT DOCUMENTS 4,623,033 11/1986 Harrison, Jr. ...................... 181/120
4,713,800 12/1987 Russell ................................ 367/144
4,754,443 6/1988 Chelminski ......................... 367/144
5,001,679 3/1991 Harrison ............................. 367/144

Primary Examiner—Ian J. Lobo
Attorney, Agent, or Firm—Arnold, White & Durkee

[57] ABSTRACT

The invention provides an air gun responsive to a supply of compressed gas, which facilitates rapid acceleration of a shuttle member to selectively actuate the air gun. The air gun includes a primary firing chamber which receives compressed gas in order to move the shuttle valve member to its full open position. The air gun also includes an initial acceleration chamber which provides an additional piston surface during the initial movement of the shuttle valve member so as to optimumly accelerate the valve member. This results in improved firing time repeatability.

14 Claims, 4 Drawing Sheets

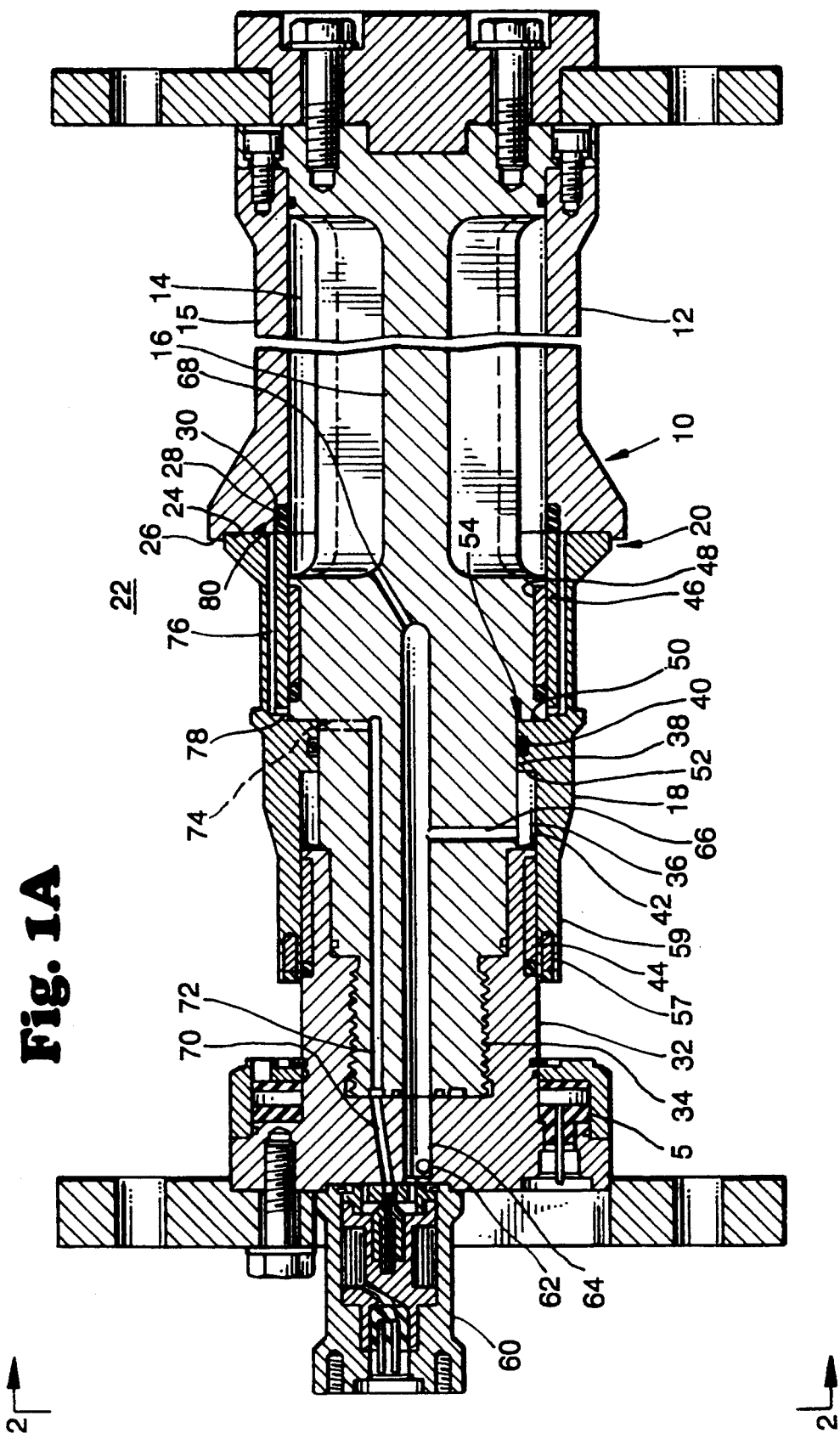

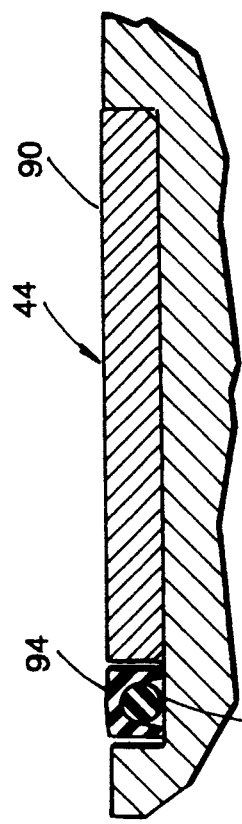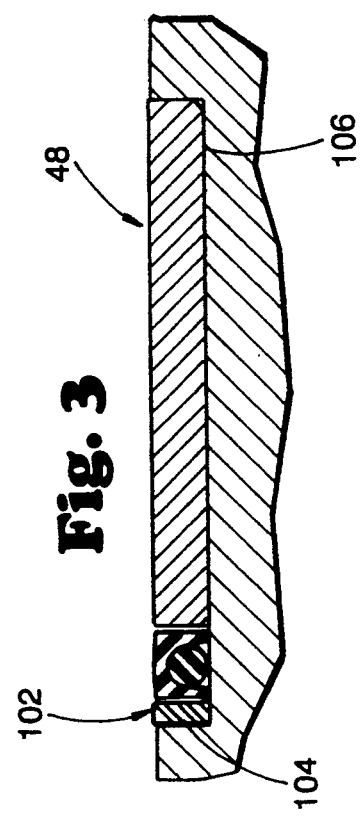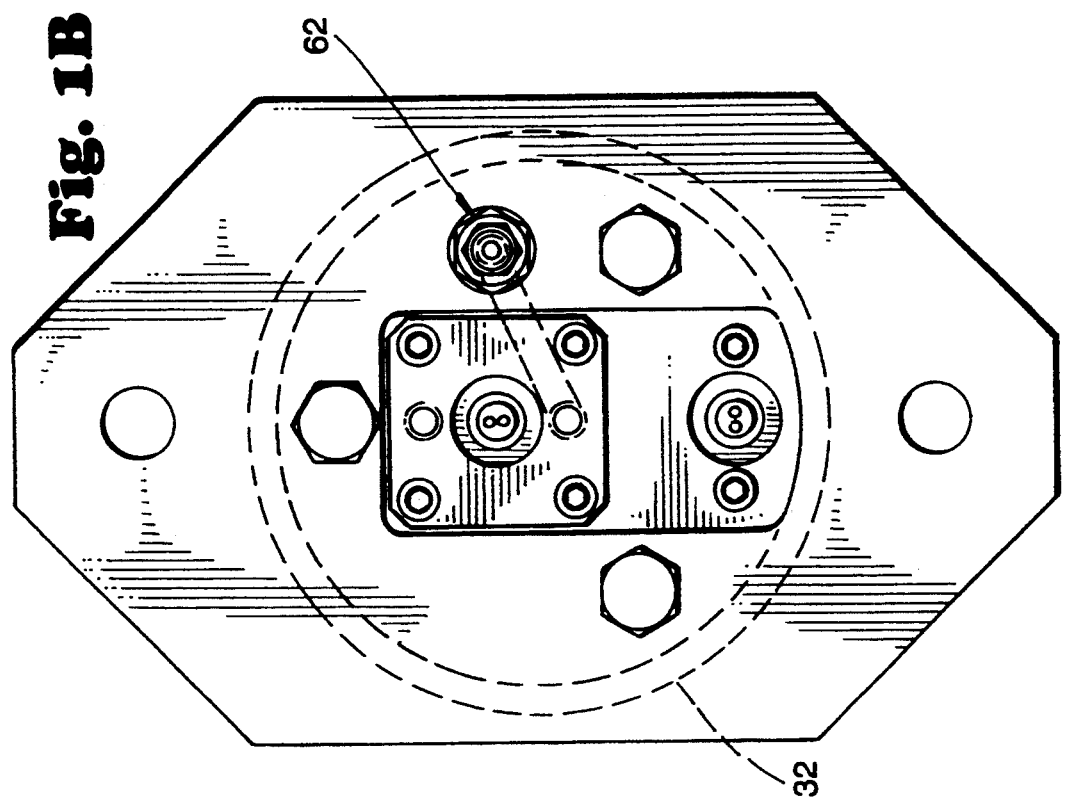

AIR GUN

BACKGROUND OF THE INVENTION

The present invention relates generally to high pressure air guns of a type utilized for seismic exploration in marine environments, and more specifically relates to a high pressure air gun having improved air flow control passages to facilitate optimal air discharge and to yield optimal repeatability in air gun firing.

As is well-known, sources of acoustic energy are utilized in marine seismic exploration to create acoustic waves that propagate from the source into the marine floor. These acoustic waves contact the floor and subfloor geologic formations and are reflected back to hydrophones or other appropriate receiving instruments which receive the reflected pressure waves and convert them into electric signals which are then recorded. Analysis of the electronic signals facilitates evaluation of the structure of subsurface geologic formations.

Many devices have been utilized for generating these acoustic waves. In recent times, a device commonly utilized is an "air gun" which may be utilized to disperse any suitable compressed, gaseous fluid, such as air, steam, nitrogen, carbon dioxide, etc. The air guns are capable of releasing high pressure air on the order of 2,000 psi to 6,000 psi in the water to create the desired acoustic waves.

Conventional air guns typically include an annular housing which defines a chamber in which compressed air is stored, and selectively openable exhaust ports which allow the stored air to escape from the housing. These exhaust ports are selectively openable in response to the movement of a shuttle valve which, when shifted, permits air to escape from the chamber through the exhaust ports in the main housing into the surrounding water.

Conventional shuttle valves include a movable member which engages seal members on a housing assembly, with the shuttle valve member being slidable across the seals to open the exhaust ports. The frictional forces presented by the seal assemblies can present a significant opposition to initial, opening, movement of the shuttle valve member. This resistance presents significant operational difficulties relative to air guns.

A primary concern in the operation of air guns in marine seismic exploration is repeatability, or consistency, in timing of the opening of the air gun. In many applications, the opening time (or firing time) of the air gun must be consistent within plus or minus one millisecond. With this standard for timing repeatability, the effects of frictional forces on the shuttle valve member can easily cause an air gun to operate out of standard. This is true particularly because when conventional air guns are "at rest", or in the closed position, before the seal to the primary chamber is broken, the energy available to break that seal and to accelerate the shuttle valve member is limited to that which may be applied through a single piston area on the shuttle valve member. There is a need, therefore, to increase the initial acceleration of the shuttle valve member from the "at rest", closed, position, without requiring dramatic modification of basic air gun design.

Accordingly, the present invention provides a new method and apparatus for increasing the shuttle valve opening force and acceleration, and thereby improving the timing reliability of the opening of the shuttle, (the air gun firing time), resulting in improved repeatability of firing time performance.

SUMMARY OF THE INVENTION

The present invention provides an air gun responsive to a supply of compressed gas. The air gun includes a housing assembly which defines a primary chamber which will contain the compressed gas to be released to create the acoustic pulse. This housing assembly includes a discharge port through which the chamber will be communicated with the environment surrounding the air gun. The air gun also includes a valve member which is movably arranged relative to the housing to selectively open and close the discharge port. In one preferred embodiment, the valve member is generally cylindrical member which is disposed essentially coaxially with at least a portion of the housing assembly, and which is slidably arranged relative to the housing assembly. In this preferred embodiment, the valve member and the housing assembly will cooperatively define a firing chamber, a portion of which chamber will be defined by a first piston surface. In one particularly preferred embodiment, this firing chamber will be an enclosed chamber. Accordingly, the application of compressed gas to the firing chamber will cause full movement of the shuttle from a first, closed, position, to a second, open, position. In this particularly preferred embodiment, the housing assembly and the valve member also form a second, acceleration, chamber which will facilitate initial acceleration of the shuttle away from its closed position. In this particularly preferred embodiment, the valve member includes a mating face which abuts and sealing engages a corresponding seal face of the housing assembly. In this particularly preferred embodiment, the acceleration chamber is formed by an annular lip which extends over the top of the valve member for a limited distance. This overlapping lip defines a small chamber which will exist during the initial movement of the valve member toward the open position to improve opening acceleration of the valve member upon actuation.

BRIEF DESCRIPTION OF THE DRAWINGS

FIGS. 1A–B depict an air gun in accordance with the present invention, depicted in FIG. 1A substantially in vertical section.

FIG. 2 depicts a rear seal assembly of the air gun of FIG. 1 in greater detail depicted in vertical section.

FIG. 3 depicts the forward seal assembly of the air gun of FIG. 1 in greater detail, depicted in vertical section.

DETAILED DESCRIPTION OF PREFERRED EMBODIMENTS

Figure 4A:
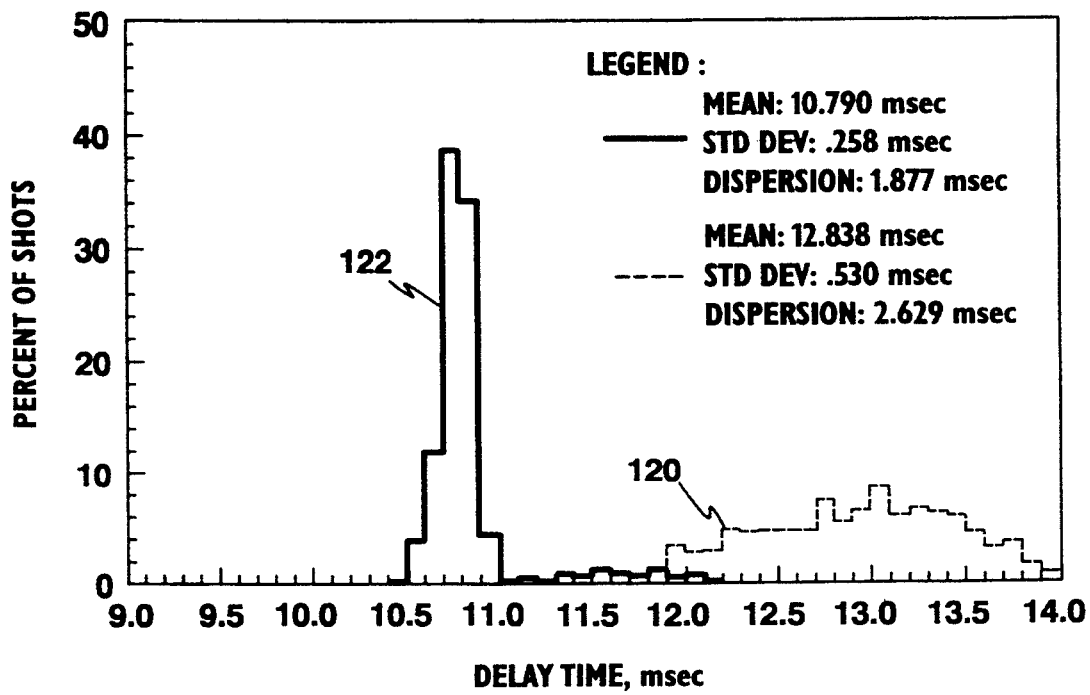
FIGS. 4A–B graphically depicts a comparison between an individual conventional air gun, and that air gun modified to be in accordance with the present invention.

Referring now to FIG. 1, therein is depicted an exemplary air gun 10, in accordance with the present invention. Air gun 10 includes a housing assembly, indicated generally at 12. Housing assembly 12 includes an outer housing 15 which cooperatively defines a generally annular primary chamber 14 around a central mandrel 16. An end cap 32 is threadably coupled to central mandrel 16 and functionally forms an extension of central mandrel 16. Outer housing 15 and mandrel 16 cooperatively define an openable 360 degree port, indicated generally at 30, which, when open, will communicate chamber 14 with the exterior 22 of air gun 10.

Outer housing 15 includes a centrally facing seal surface 24 which extends under an annular, inwardly extending, lip 26. In the preferred embodiment, annular lip 26 will extend approximately 0.120 inch beyond seal surface 24. Outer housing 15 also includes a recess 28 in which is retained an elastomeric seal 30 to provide sealing engagement proximate sealing surface 24.

An end cap 32 is threadably coupled at 34 to central mandrel 16, and functionally forms an extension of central mandrel 16. Air gun 10 includes a first sleeve shuttle 18 in slidable, generally concentric, relation to central mandrel 16 of housing assembly 12. Shuttle 18 is disposed generally concentrically with central mandrel 16 and end cap 32. Shuttle 18 includes an inwardly extending lip portion 38 which, through means of an elastomeric seal 40, sealing engages central mandrel 16. Additionally, a rear annular flange surface 42 of shuttle 18 engages a rear seal annular seal assembly 44 carried by end cap 32. Shuttle 18 cooperates with central mandrel 16 and end cap 32 to define an annular control chamber 36 between seal 40 and seal assembly 44. A forward annular flange 46 of shuttle 18 also sealing engages central mandrel 16 through a forward annular seal assembly 48 retained in central mandrel 16. Forward flange 46 and inwardly extending lip 39 of shuttle 18 cooperate with central mandrel 16 to define a firing chamber, indicated generally at 54, between seal 40 and seal assembly 48. Accordingly, extending lip 38 provides piston surfaces for both control chamber 36 and firing chamber 54. Forward surface 50 of inwardly extending lip 38 has a greater radial dimension than rearward surface 52 of lip 38. Because of the increased diameter of lip 38 relative to forward surface 50 thereof, there is a greater surface area provided to shuttle 18 relative to firing chamber 54 than relative to control chamber 36. Shuttle 18 also includes a mating face 80 which will extend beneath annular lip 26 and seal against elastomeric seal 30 in seal surface 24 of outer housing 15. Mating face 80 of shuttle 18 and annular lip 26 and seal surface 24 cooperatively define an acceleration chamber in fluid communication with primary chamber 14.

A solenoid valve 60 is shown operatively coupled to end cap 32 in a conventional manner. End cap 32 includes a primary air inlet 62, which communicates with a primary air passageway 64. Air passageway 64 communicates through air passage 66 with control chamber 36. Primary air passageway 64 is also in communication with primary chamber 14 through a passageway 68. Solenoid valve 60, in one particularly preferred embodiment, includes an air flow passageway approximately 0.318 inch in diameter (or having an area of approximately 0.079 sq. in.).

End cap 32 also includes a control air passageway 70 which is operatively coupled to a control air passageway 72 in central mandrel 16. Control air passageway 72 communicates through passageway 74 with firing chamber 54. Solenoid valve 60 controls the admission of compressed air (or other gas) from air inlet 62 to control air passageway 7. Forward flange 46 of shuttle 18 also preferably includes at least one, and preferably a plurality of, longitudinally extending passageways 76 extending between firing chamber 54 and mating face 80 of shuttle 18. Accordingly, fluid communication is provided between firing chamber 54, through passageway 76, to mating face 80 of shuttle 18.

End cap 32 also includes a sensing coil assembly 55 retained therein. Sensing coil assembly 55 cooperates with a plurality of magnets 57 secured in a relatively near end 59 of shuttle 18 to provide a sensor of shuttle opening, and therefore of air gun firing. A similar shuttle movement sensing system is disclosed in U.S. Pat. No. 4,034,827, issued Jul. 12, 1977 to Leerskov, Jr. et al., and entitled "Air Gun Utilizing Magnetized Shuttle;" and in U.S. Pat. No. 4,047,591, issued Sep. 13, 1977 to Ward et al., and entitled "Air Gun Monitoring and Synchronizing Method and Apparatus." The disclosures of U.S. Pat. Nos. 4,034,827 and 4,047,591 are hereby incorporated herein for all purposes.

Referring now to FIG. 2, therein is depicted rear annular seal assembly 44, in greater detail. Annular seal assembly 44 includes a first annular wear ring 90 which abuts a seal assembly including an O-ring 92 within an annular crown seal 94 having a generally U-shaped cross-section, within which O-ring 92 is retained. Wear ring 90 is preferably of a generally tubular configuration, and is preferably formed of Ryton TM —filled teflon. Crown seal 94 is a conventional sealing member available from Polyseal, Inc., of Salt Lake City, Utah. O-ring 92 within crown seal 90 acts as an elastomeric member to maintain secure engagement of crown seal 94 with shuttle 18.

Referring now to FIG. 3, therein is depicted forward annular seal assembly 48 in greater detail. Forward annular seal assembly 48 is very similar in construction to rear seal assembly 44 with the exception that forward annular seal assembly 48 also includes a backup ring 102, formed of Delrin ®, extending between crown seal 108 and end 104 of groove 106 in which seal assembly 48 is retained. Wear ring 110 and crown seal 108/O-ring 112 assembly are generally as described relative to FIG. 2.

In operation, air gun 10 functions as follows: pressurized source air enters air gun 10 through inlet 62 and traverses passageway 64 to both control chamber 36 and primary chamber 14. The pressure in control chamber 36 acts against rearward surface 52 of lip 38 of shuttle 18, forcing forward mating face 80 of shuttle 18 to sealing engage seal surface 24 of outer body 15 and elastomeric seal 30, as depicted in FIG. 1. Once primary chamber 14 is fully pressurized, air gun 10 is ready to fire.

Air gun 10 is fired by applying an electrical current to solenoid valve 60 to actuate the valve and allow source air to flow into actuation passageways 70, 72, and 74 and into firing chamber 54. The pressure applied in firing chamber 54 acts on forward face 50 of lip 38 to divide shuttle 18 against the spring force in control chamber 36 to move shuttle 18 to the left, as depicted in FIG. 1A, and to thereby open exhaust port 20. Additionally, however, the fluid pressure applied in chamber 54 is applied through passageways 76 and 78 in shuttle 18 to act upon seal surface 24 of outer housing 15. Accordingly, forward mating face 80 of shuttle 18 also acts as an additional piston area within the confines of the initial acceleration chamber established by annular lip 26 to accelerate shuttle 18 and drive shuttle 18 away from seal 30 to allow air from chamber 14 to contact mating face 80 of shuttle 18 to move shuttle 18 to the open position. At the time forward face 80 of shuttle 18 clears lip 26, the primary chamber air will begin to exhaust into the surrounding water through exhaust port 20 opened by movement of shuttle 18.

Figure 4B:
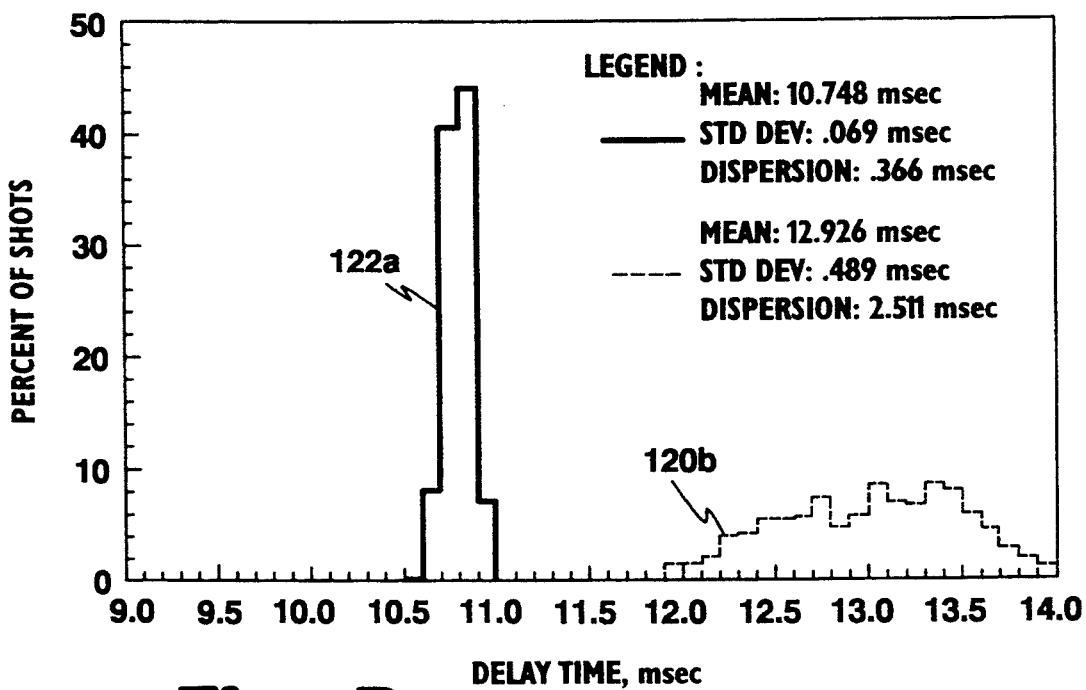

Referring now to FIGS. 4A–B, therein are graphically depicted comparisons of shot firing performance between another conventional, prior art, air gun, and that air gun modified in accordance with the present invention. FIG. 4A depicts a comparison based upon 1,000 shots, while FIG. 4B depicts a comparison of the last 500 shots of the 1,000 shot test. This minimizes the effects of "wearing in" of the gun. The performance of the conventional air gun is depicted by the dashed curve 120, while the performance of the modified air gun is portrayed by solid curve 122. The air gun utilized for generating the data reflected by each dashed line curve 120 included a solenoid valve having an air flow passage 0.25 in. in diameter (or approximately 0.049 sq. in.). The air gun utilized for generating the data reflected by solid curve 122 differs by including a "face-vented shuttle" in fluid communication with the firing chamber as described herein. The data reflected herein is provided to illustrate the improved dispersion obtained through use of the described face-vented shuttle. As can be seen in FIG. 4A, over the thousand shot cycle, the conventional air gun fired at times ranging from approximately 11.4 milliseconds to approximately over 14 milliseconds after a firing signal; representing a dispersion of 2.629 milliseconds. The mean firing time was 12.838 milliseconds, with a standard deviation of 0.530 milliseconds. By comparison, the same air gun including a face-vented shuttle, fired at times representing a dispersion of only 1.877 milliseconds, with the mean firing time being 10.790 milliseconds, with a standard deviation of 0.258 milliseconds. As shown in FIG. 4B, over the last 500 shots of the test, the conventional gun (curve 120a) fired at a mean firing time often firing a signal of 12.926 milliseconds, with a dispersion of 2.511 milliseconds and a standard deviation of 0.489 milliseconds. In contrast, the modified gun (curve 122a) fired at a mean time of 10.748 milliseconds, with a dispersion of only 0.366 milliseconds and a standard deviation of 0.069 milliseconds.

Figure 5A:
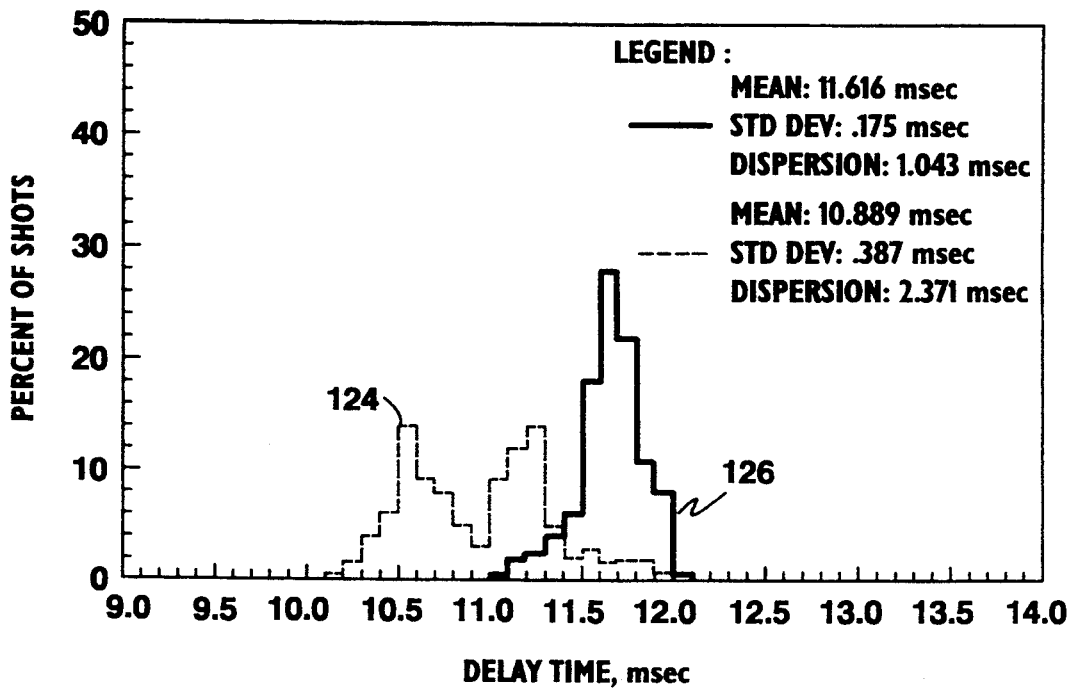
FIGS. 5A–B graphically depicts a comparison test between another individual conventional air gun, and that air gun modified to be in accordance with the present invention described herein.
Figure 5B:
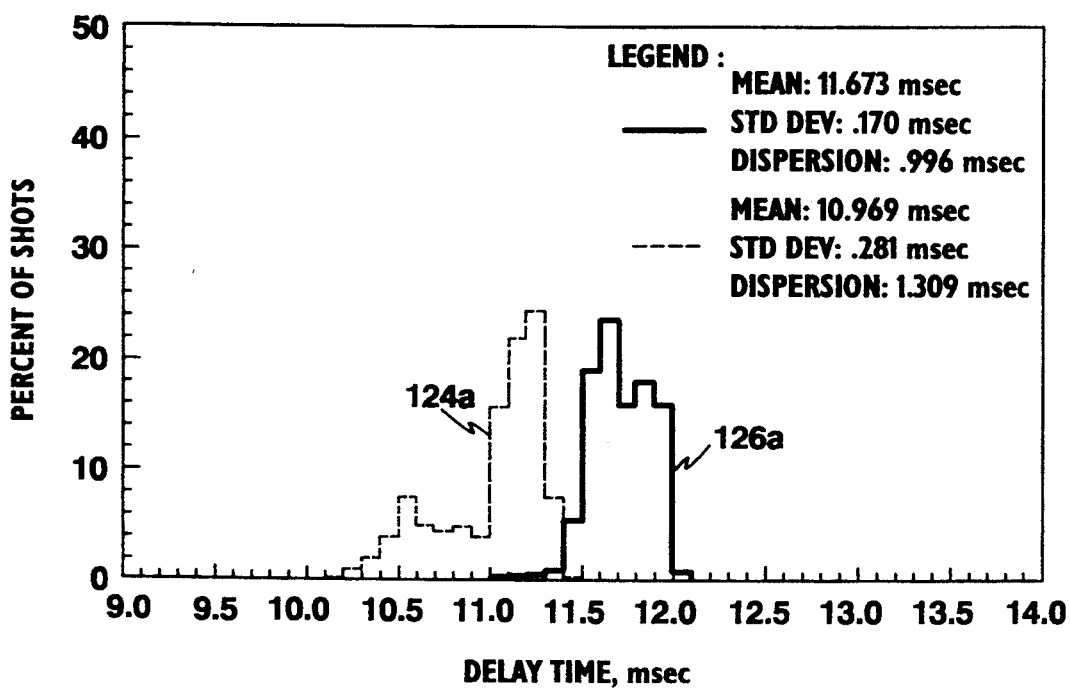

Referring now to FIGS. 5A–B, therein is reflected another comparison test of data collected from another conventional air gun, reflected by dashed curve 124 relative to that air gun as modified (illustrated by solid curve 126), in the same manner as described relative to the gun utilized in the test reflected in the graphs of FIGS. 4A–B. With this air gun test over the 1,000 shot test, the conventional air gun yielded a firing time dispersion of 2.371 milliseconds, with a mean firing time of 10.889 milliseconds, and a standard deviation of 0.387 milliseconds. By comparison, the air gun modified with the face vented shuttle yielded a firing time dispersion of 1.043 milliseconds, with a mean firing time of 11.616 milliseconds, and a standard deviation of 0.175 milliseconds.

As shown in FIG. 5B, over the last 500 shots of the test, the conventional air gun (curve 124a) yielded a dispersion of 1.309 milliseconds, with a mean firing time of 10.969 milliseconds, and a standard deviation of 0.281 milliseconds. In contrast, the air gun modified with the face-vented shuttle (curve 126a) yielded a dispersion of 0.966 milliseconds, with a mean firing time of 11.673 milliseconds, and a standard deviation of 0.170 milliseconds.

Many modifications and variations may be made in the techniques and structures described and illustrated herein without departing from the spirit and scope of the present invention. Accordingly, the embodiments described and illustrated herein are illustrative only and are not intended as limitations upon the scope of the present invention.

What is claimed is:

1. An air gun responsive to a supply of compressed gas, comprising:
   a housing assembly defining a primary chamber and a discharge port through which said primary chamber may be communicated with the environment surrounding said air gun;
   a valve member movably arranged relative to said housing assembly, said valve member movable between a first, closed, position and a second, open, position, said valve member and said housing assembly cooperatively configured with said valve member having a first surface arranged to contact a second surface on said housing assembly when said valve member is in said first, closed, position to close said discharge port, said valve member and said housing assembly cooperatively defining a firing chamber arranged to selectively receive compressed gas to move said valve member from said first position to said second position, said valve member further comprising a passageway providing fluid communication between said firing chamber and said first surface of said valve member; and
   an air control valve cooperatively arranged with said housing member to selectively supply compressed gas to said firing chamber to actuate said air gun.

2. The air gun of claim 1, wherein said housing assembly further comprises an annular surface proximate said second surface, said annular surface configured to extend around said first surface of said valve member.

3. The air gun of claim 1, wherein said valve member is arranged generally coaxially relative to at least a portion of said housing assembly.

4. The air gun of claim 1, wherein said discharge port is a three hundred and sixty degree discharge port.

5. An air gun adapted to be coupled to a compressed gas source, said air gun comprising:
   a housing assembly defining a primary chamber and a port for communicating said primary chamber with the environment exterior to said air gun housing assembly;
   a valve shuttle slidably disposed relative to said housing assembly, said shuttle moveable between a first position closing said discharge port and a second position opening said discharge port, said valve shuttle and said housing assembly cooperatively substantially defining a control chamber and a firing chamber, said shuttle having a first sealing surface placed to engage a second sealing surface on said housing assembly when said shuttle is in said first, closed, position, said shuttle having at least one passageway providing fluid communication between said firing chamber and said first sealing surface;
   a valve for selectively supplying compressed gas from said compressed gas source to said firing chamber to actuate said air gun.

6. An air gun adapted to be coupled to a compressed gas source, said air gun comprising:
   a housing assembly defining a primary chamber and a discharge port for communicating said primary chamber with the environment exterior to said air gun housing assembly;

a valve member movably arranged relative to said housing assembly, said valve member movable between a first position closing said discharge port and a second position opening said discharge port, said valve member having first and second piston areas, said first piston area of a first diameter, and said second piston area of a second, larger, diameter; said first and second piston areas cooperatively arranged to cooperatively move said valve member from said first position to said second position in response to compressed gas from said compressed gas source; said valve member and said housing assembly cooperatively including air passageways arranged to selectively supply compressed gas from said compressed gas source to said first and second piston areas;

wherein said housing assembly and said valve member cooperatively define a firing chamber, and wherein said valve member includes a plurality of fluid passageways communicating said firing chamber with said second piston area.

7. The air gun of claim 6, wherein said valve member is slidably disposed relative to said housing assembly.

8. The air gun of claim 6, wherein said valve member is concentrically disposed relative to said housing assembly, and wherein said first and second piston areas each comprise annular surfaces.

9. The air gun of claim 6, wherein said housing assembly includes a lip which cooperates with said valve member to define an acceleration chamber at least partially defined by said second piston area surface.

10. The air gun of claim 6, wherein said discharge port is a three hundred and sixty degree discharge port.

11. An air gun responsive to a supply of compressed air, comprising:
a housing assembly defining a firing chamber arranged for selective communication with said supply of compressed air, said housing assembly further defining a discharge port through which said firing chamber may be communicated with the environment surrounding said air gun, said housing assembly further defining a control air passageway in selective communication with said supply of compressed air;

a valve member movably arranged relative to said housing assembly, said valve member movable between a first, closed, position and a second, opened, position; said valve member and said housing assembly cooperatively configured with said valve member having a first surface arranged to contact a second surface on said housing assembly when said valve member is in said first, closed, position to close said discharge port; said valve member and said housing assembly cooperatively defining a firing chamber in fluid communication with said control air passageway, said firing chamber arranged to receive compressed gas from said control air passageway to move said valve member from said first position to said second position; said valve member further comprising a passageway providing fluid communication between said firing chamber and said control air passageway and said first surface of said valve member; and an air control valve cooperatively arranged with said housing member to selectively supply compressed gas to said control air passageway, and thereby to said firing chamber and to said first surface of said valve member to actuate said air gun.

12. The air gun of claim 11, wherein said housing assembly further comprises an annular lip extending from said second surface of said housing assembly, said annular lip configured to extend around said first surface of said valve member.

13. The air gun of claim 11, wherein said valve member is arranged generally coaxially relative to at least a portion of said housing assembly.

14. An air gun responsive to a supply of compressed air, comprising:
a housing assembly defining a firing chamber arranged for selective communication with said supply of compressed air, said housing assembly further defining a three hundred sixty degree discharge port through which said firing chamber may be communicated with the environment surrounding said air gun, said housing assembly further defining a control air passageway in selective communication with said supply of compressed air;

a valve member movably arranged relative to said housing assembly, said valve member arranged generally coaxially relative to at least a portion of said housing assembly, said valve member movable between a first, closed, position and a second, opened, position, said valve member and said housing assembly cooperatively configured with said valve member, said valve member having a first surface arranged to contact a second surface on said housing assembly when said valve member is in said first, closed, position to close said discharge port; said valve member and said housing assembly cooperatively defining a firing chamber in fluid communication with said control air passageway, said firing chamber arranged to receive compressed gas from said control air passageway to move said valve member from said first position to said second position; said valve member further comprising a passageway providing fluid communication between said firing chamber and said control air passageway and said first surface of said valve member; and an air control valve cooperatively arranged with said housing member to selectively supply compressed gas to said control air passageway, and thereby to said firing chamber and to said first surface of said valve member to actuate said air gun.

* * * * *

UNITED STATES PATENT AND TRADEMARK OFFICE
CERTIFICATE OF CORRECTION

PATENT NO. : 5,365,493
DATED : November 15, 1994
INVENTOR(S) : E. R. Harrison

It is certified that error appears in the above-indentified patent and that said Letters Patent is hereby corrected as shown below:

On the title page item [73],
In the Assignee, the name should be --Western Atlas
    International, Inc., Houston, Texas--.
Column 2, line 15, between "is" and "generally",
    insert --a--.
Column 3, line 6, "30" should be --20--;
         line 32, "39" should be --38--;
         line 67, "7" should be --70--.
Column 4, line 57, "divide" should be --drive--.
Column 5, lines 37-38, delete "often firing a signal";
         line 55, "face vented" should be --face-vented--;
         line 66, "0.966" should be --0.996--.

Signed and Sealed this

Third Day of October, 1995

Attest:

BRUCE LEHMAN

Attesting Officer     Commissioner of Patents and Trademarks